United States Patent [19]

Sauer

[11] Patent Number: 5,050,702
[45] Date of Patent: Sep. 24, 1991

[54] CHASSIS MOUNT

[75] Inventor: Wolfgang Sauer, Ransbach, Fed. Rep. of Germany

[73] Assignee: Metzeler GmbH, Munich, Fed. Rep. of Germany

[21] Appl. No.: 485,162

[22] Filed: Feb. 26, 1990

[30] Foreign Application Priority Data

Feb. 24, 1989 [DE] Fed. Rep. of Germany ....... 3905868

[51] Int. Cl.$^5$ ............................................. B16F 13/00
[52] U.S. Cl. ................................ 180/300; 267/140.1; 267/219
[58] Field of Search ............... 267/140.1, 141.3, 141.4, 267/141.7, 219, 293; 180/300; 280/688, 689, 716, 717

[56] References Cited

U.S. PATENT DOCUMENTS

| 2,781,990 | 2/1957 | Via | 267/141.7 |
| 3,737,174 | 6/1973 | Hickman | 280/717 |
| 4,570,911 | 2/1986 | Konishi | 267/219 |
| 4,767,107 | 8/1988 | Le Fol | 267/141.4 X |
| 4,921,232 | 5/1990 | Hofmann | 267/219 |

FOREIGN PATENT DOCUMENTS 2647298 4/1987 Fed. Rep. of Germany .

Primary Examiner—Andres Kashnikow
Assistant Examiner—Michael Mar
Attorney, Agent, or Firm—Herbert L. Lerner; Laurence A. Greenberg

[57] ABSTRACT

A chassis mount for a vehicle having a chassis and a wheel suspension includes an approximately frustoconical rubber body having a lower surface and being retained in the chassis. A central bushing is disposed inside the rubber body. A bolt has ends and is guided in the central bushing. A fork structure articulatingly connects the ends of the bolt to the wheel suspension. A hydraulically damping mount element has two liquid chambers communicating with one another through an overflow conduit. The chambers include a working chamber with an upper surface. The hydraulically damping mount element is mounted as a modular component onto the lower surface of the rubber body with the lower surface of the rubber body forming the upper end surface of the working chamber.

6 Claims, 1 Drawing Sheet

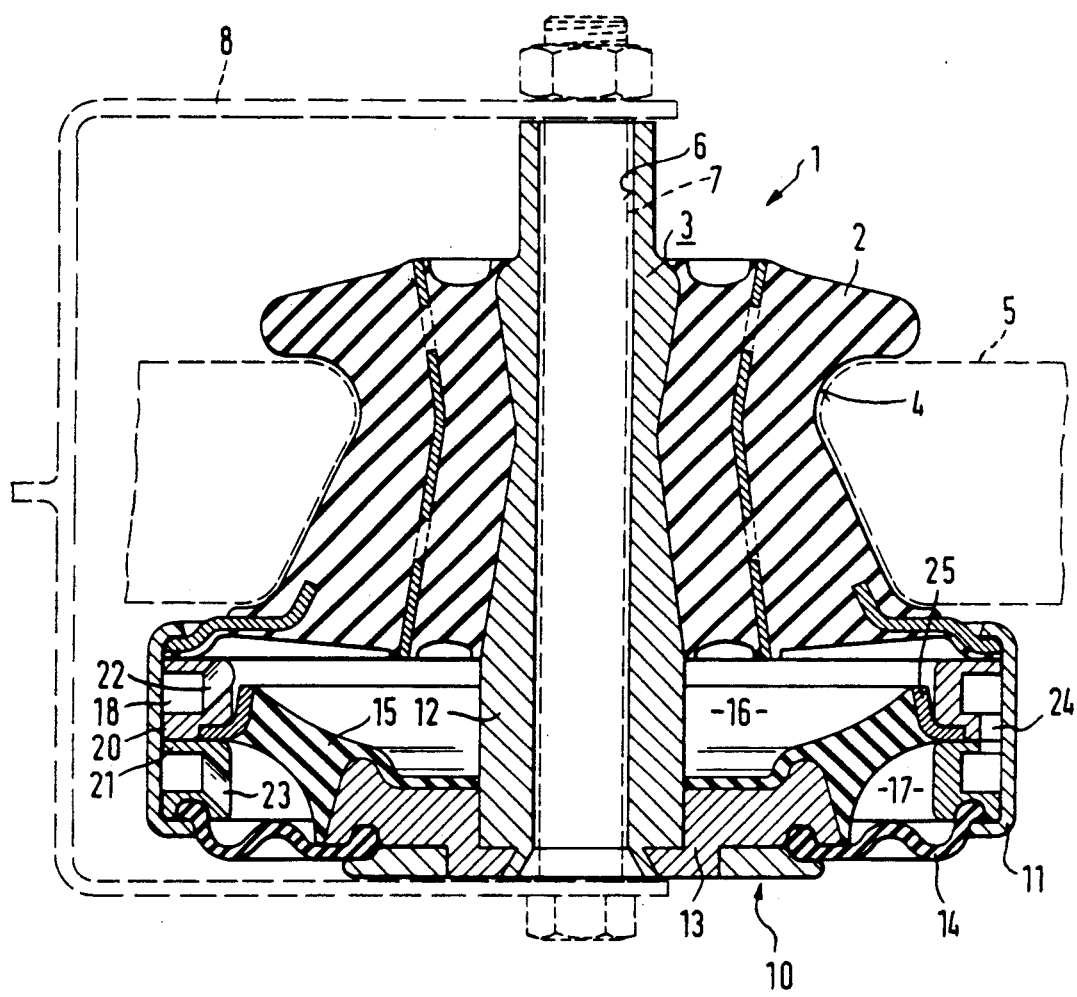

CHASSIS MOUNT

The invention relates to a chassis mount or bearing, in particular for the rear axle of a motor vehicle, having an approximately frustoconical rubber body retained in the chassis and a central bushing on the inside with a bolt guided therein, the bolt being articulated at ends thereof to the wheel suspension through a fork structure.

With a conventional mount of the type described above, vibration of the rear axle or of the wheel suspension can be damped. The damping is generated solely by properties inherent in the elastomeric material which is used and therefore has limitations.

It is accordingly an object of the invention to provide a chassis mount or bearing, which overcomes the hereinafore-mentioned disadvantages of the heretofore-known devices of this general type and improve it in such a way that greater damping work is possible, and in particular a damping of excitation amplitudes of 1 to 3 mm between 2 and 6 Hz, which are the kind that occur most frequently with vibration in such chassis components.

With the foregoing and other objects in view there is provided, in accordance with the invention, a chassis mount for a vehicle having a chassis and a wheel suspension, in particular for the rear axle of a motor vehicle, comprising an approximately frustoconical rubber body having a lower surface and being retained in the chassis, a central bushing disposed inside the rubber body, a bolt having ends and being guided in the central bushing, a fork structure articulatingly connecting the ends of the bolt to the wheel suspension, and a hydraulically damping mount element having two liquid chambers communicating with one another through an overflow conduit, the chambers including a working chamber with an upper surface, the hydraulically damping mount element being mounted as a modular component onto the lower surface of the rubber body with the lower surface of the rubber body forming the upper end surface of the working chamber.

Hydraulically damping two-chamber mounts of such a kind, in the form of engine mounts as known, for instance, from German Published, Non-Prosecuted Application DE-OS 29 06 282, allow purposeful damping of certain amplitudes at minimum frequencies, depending on the structural shape and in particular on the length of the overflow conduit. With the above-described combination of a conventional chassis mount with a hydraulically damping mount mounted practically as a modular unit, a conventional bushing bearing can thus be improved in a simple manner in such a way that the vibration excitations that occur most frequently at the rear axle can be damped purposefully.

In accordance with another feature of the invention, the rubber body has a lower outer edge, the hydraulically damping mount element has an external cylindrical housing flanged to the lower outer edge of the rubber body, the overflow conduit is multi-helical, extends inside the housing and has a lower outlet, the central bushing has an axial extension with approximately the same length as the housing and an end surface, and there is provided a rigid plate being flanged to the end surface of the extension and having an outer periphery and a smaller diameter than the housing defining a gap between the outer periphery of the plate and the housing, and two mutually spaced apart parallel annular rubber walls bridging the gap, the lower outlet discharging between the walls.

In accordance with a further feature of the invention, the overflow conduit has an inner wall, the rubber walls include an outer rubber wall in the form of a flexible, elastically resilient end-surface closure between the housing and the rigid plate, and an inner rubber wall in the form of a support spring having a conical surface and being disposed between the rigid plate and the inner wall of the overflow conduit, the working chamber being formed between the support spring and the lower surface or end wall of the rubber body, and the hydraulically damping mount element also including a compensating chamber formed between the support spring and the outer rubber wall.

In accordance with an added feature of the invention, the housing has an inner wall surface, the overflow conduit has upper and lower annular conduit parts having U-shaped cross sections with laterally oriented openings and mutually adjacent partitions, the conduit parts are attached to the housing with the openings facing the inner wall surface, the upper conduit part has an inlet opening formed therein oriented obliquely inward, the lower conduit part has an outlet opening formed therein oriented obliquely inward, and the partitions have a connecting opening formed therein for hydraulic liquid. This is done in order to attain the longest possible length and a large cross section of the overflow conduit.

In accordance with a concomitant feature of the invention, the support spring has an outer periphery attached between the conduit parts.

Other features which are considered as characteristic for the invention are set forth in the appended claims.

Although the invention is illustrated and described herein as embodied in a chassis mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing is a longitudinal-sectional view of a chassis mount or bearing according to the invention.

Referring now in detail to the single figure of the drawing, there is seen a chassis mount or bearing which is typically installed as a front mount on the rear axle of a rear-wheeldrive motor vehicle. The mount has a conventional bushing bearing 1, which is formed of an approximately frustoconical rubber body 2 and a central bushing 3. The rubber body 2 is radially fastened in a vehicle chassis 5 serving as a fixed point, in the vicinity of a restriction 4. A screw bolt 7, which is guided through a central bore 6 formed in the bushing 3, connects the bushing to the rear wheel suspension through a fork structure 8, in a non-illustrated manner.

This mount is installed in the vertical direction as shown; the static initial load is oriented upward with respect to the vehicle or in other words toward the top as seen in the drawing, and the bushing slides upward as well.

Damping action used to counter incident seesaw oscillations of the rear wheel suspension, is attainable only with the inherent damping provided by the material of the bushing. However, in order to enable purposeful damping even of particularly disruptive and frequently occurring excitation amplitudes on the order of magnitude of from 1–3 mm between 2 and 6 Hz, according to the invention the conventional bushing bearing 1 is expanded with hydraulic damping means adjustable to such special demands. This is done by combining it with a modified hydraulically damping two-chamber mount 10, which is mounted on or integrated with the bushing bearing 1, practically as a modular component unit.

In order to accomplish this, a cylindrical housing 11 is flanged to the outer lower end of the rubber body 2, and the bushing 3 is extended downward by an extension 12 having the length of the housing 11. The bushing extension 12 has a horizontally extending plate 13 on the end surface thereof. The outer diameter of the plate 13 is less than the diameter of the housing 11, amounting to approximately one-half to two-thirds of the housing diameter. An open gap on the end surface between the housing 11 and the plate 13 is bridged with a diaphragm-like soft elastic rubber wall 14 and closed in a sealing manner. Inside a chamber which is thereby formed between the outer periphery of the plate 13 and approximately half the height of the housing 11, a further obliquely placed rubber wall 15 is additionally provided, acting as a hydraulic support spring, which may take the shape of a frustoconical surface and may have the same hardness as the rubber body 2. Therefore, the gap is bridged by two annular rubber walls in the form of the elements 14 and 15. Thus two chambers filled with a hydraulic fluid, namely a working chamber 16 and compensating chamber 17, which communicate with one another through a long overflow conduit 18, are separated from one another by the rubber wall 15 which is in the form of a hydraulic support spring.

In the exemplary embodiment shown, the overflow conduit 18 is formed by two annular conduit parts 20 and 21 having a horizontal U-shaped cross section with an end which is open toward the outside. These parts are attached with the open end facing toward the inner wall of the housing 11. The upper conduit part 20 has an inlet opening 22 oriented obliquely upward and leading to the working chamber 16 and the lower conduit part 21 has an outlet opening 23 leading to the compensating chamber 17 and likewise oriented obliquely upward. The upper and lower conduit parts communicate with one another through a connecting opening 24. Naturally, the inlet and outlet openings 22 and 23 and the connecting opening 24 need not be located at the point along the circumference shown in the drawing, but instead may be associated arbitrarily with one another depending on the required length of the overflow conduit 18.

In this embodiment of the overflow conduit 18, it is also practical for the support spring 15 to be attached to the outer periphery through a vulcanized-on angle ring 25 between the two conduit parts 20 and 21, acting as an outer fixation point.

With the embodiment described above, a very compact structure is attained, and the hydraulically damping mount element is attachable practically as a modular unit to a conventional bushing bearing. With excitation amplitudes of from 1 to 3 mm, a strong hydraulic damping action is produced, with a maximum phase angle of more than 30° at 4 Hz. This coordination is attained by means of a very long overflow conduit 18, which is located at the largest possible diameter, and because of its practically double helical shape it can attain a ratio of length to diameter of up to 120 to 1. The definitive factor is also the high volumetric rigidity of the conventional rubber body 2 and of the hydraulic support spring 15, as well as their large effective cross section. Upon spring deflection, the positive displacement volume of the hydraulic support spring, on one hand, and the liberated volume of the conventional rubber spring, on the other hand, results in an adequately large volumetric flow through the overflow conduit 18, as a result of which the spring damping is attained.

I claim:

1. Chassis mount for a vehicle having a chassis and a wheel suspension, comprising an approximately frustoconical rubber body having a lower surface and being retained in the chassis, a central bushing disposed inside said rubber body, a bolt having ends and being guided in said central bushing, a fork structure articulatingly connecting the ends of said bolt to the wheel suspension, and a hydraulically damping mount element having two liquid chambers communicating with one another through an overflow conduit, said chambers including a working chamber with an upper surface, said hydraulically damping mount element being mounted as a modular component onto said lower surface of said rubber body with said lower surface of said rubber body forming said upper end surface of said working chamber, wherein said rubber body has a lower outer edge, said hydraulically damping mount element has an external cylindrical housing flanged to said lower outer edge of said rubber body, said overflow conduit is multi-helical, extends inside said housing and has a lower outlet, said central bushing has an axial extension with approximately the same length as said housing and an end surface, and including a rigid plate being flanged to said end surface of said extension and having an outer periphery and a smaller diameter than said housing defining a gap between said outer periphery of said plate and said housing, and two mutually spaced apart parallel annular rubber walls bridging said gap, said lower outlet discharging between said walls.

2. Chassis mount according to claim 1, wherein said overflow conduit has an inner wall, said rubber walls include an outer rubber wall in the form of a flexible, elastically resilient end-surface closure between said housing and said rigid plate, and an inner rubber wall in the form of a support spring having a conical surface and being disposed between said rigid plate and said inner wall of said overflow conduit, said working chamber being formed between said support spring and said lower surface of said rubber body, and said hydraulically damping mount element also including a compensating chamber formed between said support spring and said outer rubber wall.

3. Chassis mount according to claim 1, wherein said housing has an inner wall surface, said overflow conduit has upper and lower annular conduit parts having U-shaped cross sections with laterally oriented openings and mutually adjacent partitions, said conduit parts are attached to said housing with said openings facing said inner wall surface, said upper conduit part has an inlet opening formed therein oriented obliquely inward, said lower conduit part has an outlet opening formed therein oriented obliquely inward, and said partitions have a connecting opening formed therein for hydraulic liquid.

4. Chassis mount according to claim 3, wherein said overflow conduit has an inner wall, said rubber walls include an outer rubber wall in the form of a flexible, elastically resilient end-surface closure between said housing and said rigid plate, and an inner rubber wall in the form of a support spring having a conical surface and being disposed between said rigid plate and said inner wall of said overflow conduit, said working chamber being formed between said support spring and said lower surface of said rubber body, and said hydraulically damping mount element also includes a compensating chamber formed between said support spring and said outer rubber wall, said support spring having an outer periphery attached between said conduit parts.

5. Chassis mount according to claim 1, wherein said fork structure is connected to the rear axle of a motor vehicle.

6. Chassis mount for a vehicle having a chassis and a wheel suspension, comprising an approximately frusto-conical rubber body having a lower surface and an outer edge, said rubber body being retained in the chassis, a central bushing disposed inside said rubber body, a bolt having ends and being guided in said central bushing, a fork structure articulatingly connecting the ends of said bolt to the wheel suspension, a hydraulically damping mount element including a working chamber and a compensating chamber disposed on said lower surface of said rubber body, said central bushing having an axial extension with an end surface and a rigid plate disposed on said end surface of said extension, said plate having a periphery and an outer free end, a housing flanged on said outer edge of said rubber body, a cone-shaped rubber wall acting as a carrier spring extending from said periphery of said rigid plate to said housing, a flexible rubber wall bridging said free end of said plate and said housing, said cone shaped rubber wall and said lower surface of said rubber body forming the work chamber thereinbetween, said cone shaped rubber wall and said flexible rubber wall forming the compensating chamber thereinbetween, and said chamber communicating with one another through a multi-channel overflow conduit disposed on the inside of said housing.

* * * * *